(12) United States Patent
Pyo et al.

(10) Patent No.: US 12,210,385 B2
(45) Date of Patent: Jan. 28, 2025

(54) DISPLAY DEVICE INCLUDING FLEXIBLE DISPLAY PANEL AND PANEL ROLLER

(71) Applicant: LG ELECTRONICS INC., Seoul (KR)

(72) Inventors: Jonggil Pyo, Seoul (KR); Jingyu Kim, Seoul (KR); Kwaneun Jin, Seoul (KR); Jaeyong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 168 days.

(21) Appl. No.: 17/923,527

(22) PCT Filed: May 7, 2020

(86) PCT No.: PCT/KR2020/005974
§ 371 (c)(1),
(2) Date: Nov. 4, 2022

(87) PCT Pub. No.: WO2021/225188
PCT Pub. Date: Nov. 11, 2021

(65) Prior Publication Data
US 2023/0185337 A1    Jun. 15, 2023

(51) Int. Cl.
*G06F 1/16*   (2006.01)

(52) U.S. Cl.
CPC .......... *G06F 1/1652* (2013.01); *G06F 1/1656* (2013.01)

(58) Field of Classification Search
CPC ...... G06F 1/1652; G06F 1/1656; G09F 9/301; H04M 1/0268
See application file for complete search history.

(56) References Cited

U.S. PATENT DOCUMENTS 4,852,553 A * 8/1989 Voykin ................ A61H 39/04
601/28
4,857,969 A * 8/1989 Okada ................ G03G 15/6579
355/56
(Continued)

FOREIGN PATENT DOCUMENTS

JP   H07219461   8/1995
JP   H1013772    1/1998
(Continued)

OTHER PUBLICATIONS

European Patent Office Application Serial No. 20934334.2, Search Report dated Jan. 29, 2024, 9 pages.
(Continued)

*Primary Examiner* — Rockshana D Chowdhury
*Assistant Examiner* — Douglas R Burtner
(74) *Attorney, Agent, or Firm* — LEE, HONG, DEGERMAN, KANG & WAIMEY

(57) ABSTRACT

Disclosed is a display device. The display device may comprise: a flexible display panel; a panel roller which extends lengthily and on/from which the display panel is wound/unwound; a bottom frame to which the panel roller is rotatably mounted; a first vertical frame which extends lengthily in a direction crossing the longitudinal direction of the panel roller and is fixed to the bottom frame; a top block fixed to the top side of the first vertical frame; a first slider moving on the first vertical frame in the up-down direction; an upper roller rotatably installed on the top block; a roller mount which is positioned adjacent to the lower end of the first vertical frame and fixed to the bottom frame; a lower roller rotatably installed on the roller mount; a belt which is wound on the upper roller and the lower roller and to which the first slider is fixed; and a bar to which the end of the display panel is fixed and which is coupled to the first slider.

10 Claims, 19 Drawing Sheets

(56) References Cited

U.S. PATENT DOCUMENTS

| | | | | |
|---|---|---|---|---|
| 7,830,333 B2* | 11/2010 | Aoki | ............... | G06F 1/1652 345/1.3 |
| 9,560,750 B2* | 1/2017 | Lee | ............... | G06F 1/1652 |
| 9,817,443 B2* | 11/2017 | Kim | ............... | G06F 1/1652 |
| 9,860,353 B2* | 1/2018 | Lee | ............... | H04M 1/0268 |
| 10,321,583 B2* | 6/2019 | Seo | ............... | G06F 1/1624 |
| 10,347,160 B2* | 7/2019 | Takayanagi | ............... | G09F 9/301 |
| 11,016,532 B2* | 5/2021 | Yang | ............... | H04M 1/0268 |
| 11,107,374 B2* | 8/2021 | Lee | ............... | G09F 9/301 |
| 11,395,422 B2* | 7/2022 | Suga | ............... | G09F 9/30 |
| 11,480,241 B2* | 10/2022 | Eom | ............... | G09F 13/0454 |
| 2004/0128880 A1* | 7/2004 | Abe | ............... | G09F 11/29 40/514 |
| 2006/0150452 A1* | 7/2006 | Chen | ............... | G09F 11/29 40/471 |
| 2006/0162201 A1* | 7/2006 | Brahmig | ............... | G09F 11/29 40/515 |
| 2006/0168857 A1* | 8/2006 | Kim | ............... | G09F 17/00 40/606.01 |
| 2007/0125727 A1* | 6/2007 | Winkler | ............... | B65G 1/0435 211/59.2 |
| 2008/0261678 A1* | 10/2008 | Seelig | ............... | G07F 17/32 463/16 |
| 2008/0308666 A1* | 12/2008 | Cowdrey | ............... | G09F 11/21 242/528 |
| 2011/0088994 A1* | 4/2011 | Wu | ............... | A47F 5/03 198/300 |
| 2016/0120022 A1* | 4/2016 | Lee | ............... | H04M 1/0268 361/749 |
| 2016/0155965 A1* | 6/2016 | Kusuura | ............... | H10K 71/50 29/829 |
| 2016/0320804 A1* | 11/2016 | Takayanagi | ............... | H04M 1/0268 |
| 2016/0324021 A1* | 11/2016 | Takayanagi | ............... | G06F 1/1652 |
| 2017/0156219 A1* | 6/2017 | Heo | ............... | G06F 1/1679 |
| 2017/0344073 A1* | 11/2017 | Kang | ............... | G06F 1/1679 |
| 2018/0084659 A1* | 3/2018 | Pecorino | ............... | E06B 9/40 |
| 2018/0102073 A1* | 4/2018 | Cleeves | ............... | G09F 19/226 |
| 2018/0103550 A1* | 4/2018 | Seo | ............... | H01F 7/0205 |
| 2018/0103551 A1* | 4/2018 | Park | ............... | H05K 5/0217 |
| 2019/0197960 A1* | 6/2019 | Kim | ............... | G09G 3/035 |
| 2019/0204874 A1* | 7/2019 | Kim | ............... | G06F 1/1643 |
| 2020/0008309 A1* | 1/2020 | Kim | ............... | H10K 59/873 |
| 2020/0033913 A1* | 1/2020 | Yang | ............... | H04M 1/0268 |
| 2020/0135064 A1* | 4/2020 | Lee | ............... | G06F 1/1684 |
| 2020/0201394 A1* | 6/2020 | Choi | ............... | H05K 5/0017 |
| 2020/0337161 A1* | 10/2020 | Choi | ............... | B32B 27/281 |
| 2021/0337684 A1* | 10/2021 | Pyo | ............... | G06F 1/16 |
| 2022/0346250 A1* | 10/2022 | Kim | ............... | G06F 1/16 |
| 2022/0404251 A1* | 12/2022 | Lee | ............... | G01N 3/20 |

FOREIGN PATENT DOCUMENTS

| | | |
|---|---|---|
| KR | 100772635 | 11/2007 |
| KR | 1020180045980 | 5/2018 |
| KR | 1020190092980 | 8/2019 |
| WO | 2020054923 | 3/2020 |

OTHER PUBLICATIONS

PCT International Application No. PCT/KR2020/005974, International Search Report dated Jan. 26, 2021, 3 pages.

* cited by examiner

DISPLAY DEVICE INCLUDING FLEXIBLE DISPLAY PANEL AND PANEL ROLLER

CROSS-REFERENCE TO RELATED APPLICATION

This application is the National Stage filing under 35 U.S.C. 371 of International Application No. PCT/KR2020/005974, filed May 7, 2020, the contents of which are hereby incorporated by reference herein in their entirety.

TECHNICAL FIELD

The present disclosure relates to a display device.

BACKGROUND ART

As the information society develops, the demand for display devices is also increasing in various forms. In response to this, various display devices such as Liquid Crystal Display Device (LCD), Plasma Display Panel (PDP), Electroluminescent Display (ELD), Vacuum Fluorescent Display (VFD), and Organic Light Emitting Diode (OLED) have been researched and used in recent years.

An OLED panel can display an image by depositing an organic material layer that can emit light by itself on a substrate on which a transparent electrode is formed. The OLED panel may have flexible characteristics as well as a thin thickness. The OLED panel having a flexible characteristic may display an image while being wound around or unwound from a roller.

Recently, a lot of research has been accomplished on a structural characteristic of a display device having such flexible panels.

DISCLOSURE

Technical Problem

The present disclosure has been made in view of the above problems, and provides a mechanism for stably winding or unwinding a flexible display panel.

The present disclosure further provides a frame structure that can be covered by a display panel or can be opened.

Technical Solution

In accordance with an aspect of the present disclosure, a display device includes: a flexible display panel: a panel roller which extends long, and around which the display panel is wound or from which the display panel is unwound: a bottom frame in which the panel roller is rotatably mounted: a first vertical frame which extends long in a direction intersecting a longitudinal direction of the panel roller, and is fixed to the bottom frame: a top block fixed to an upper side of the first vertical frame; a first slider which moves in an up-downward direction in the first vertical frame; an upper roller rotatably installed in the top block: a roller mount which is located adjacent to a lower end of the first vertical frame, and fixed to the bottom frame: a lower roller rotatably installed in the roller mount: a belt which is wound around the upper roller and the lower roller, and to which the first slider is fixed; and a bar to which a distal end of the display panel is fixed, and which is coupled to the first slider.

Advantageous Effects

According to at least one embodiment of the present disclosure, a mechanism for stably winding or unwinding a flexible display panel may be provided.

According to at least one embodiment of the present disclosure, a frame structure that can be covered by a display panel or can be opened may be provided.

Further scope of applicability of the present disclosure will become apparent from the following detailed description. However, it should be understood that the detailed description and specific embodiments such as preferred embodiments of the present disclosure are given by way of example only, since various changes and modifications within the spirit and scope of the present disclosure may be clearly understood by those skilled in the art.

MODE FOR INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

Figure 1:
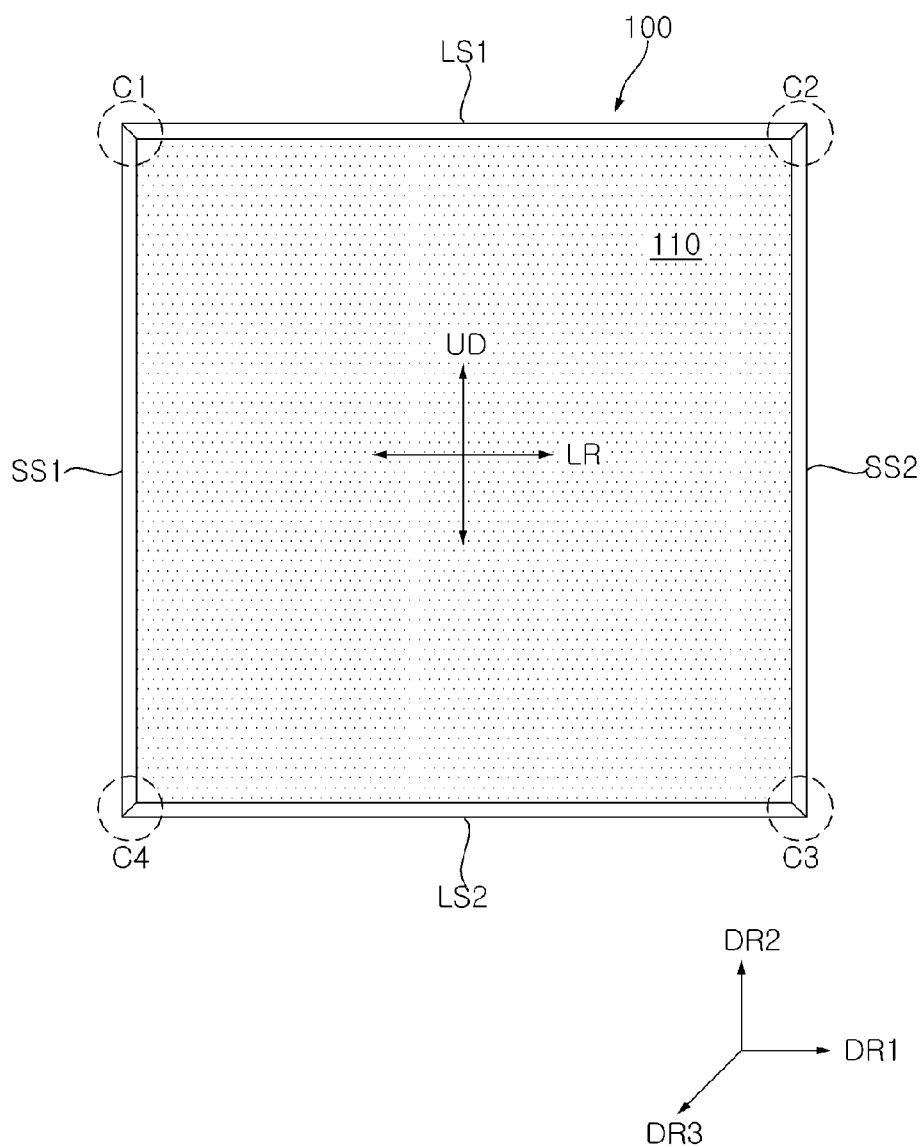
FIGS. 1 to 19 are diagrams illustrating examples of a display device according to embodiments of the present disclosure.

Referring to FIG. 1, a display device may include a first long side LS1, a second long side LS2 opposite the first long side LS1, a first short side SS1 adjacent to the first long side LS1 and the second long side LS2, and a second short side SS2 opposite the first short side SS1.

The first short side area SS1 of the display device may be referred to as a first side area, and the second short side area SS2 of the display device may be referred to as a second side area. The first long side area LS1 of the display device may be referred to as a third side area adjacent to the first side area and the second side area and located between the first side area and the second side area, and the second long side area LS2 of the display device may be referred to as a fourth side area adjacent to the first side area and the second side area, located between the first side area and the second side area, and opposite the third side area.

Although the length of the first and second long sides LS1 and LS2 is shown and described as being greater than the length of the first and second short sides SS1 and SS2 for convenience of description, the length of the first and second long sides LS1 and LS2 may be approximately equal to the length of the first and second short sides SS1 and SS2.

In the following description, a first direction DR1 may be a direction parallel to the long sides LS1 and LS2 of a display device, and a second direction DR2 may be a direction parallel to the short sides SS1 and SS2 of the display device. A third direction DR3 may be a direction perpendicular to the first direction DR1 and/or the second direction DR2.

The first direction DR1 and the second direction DR2 may be referred to as a horizontal direction. Further, the third direction DR3 may be referred to as a vertical direction.

When the display device is seen from the front or the front surface, the first long side portion LS1 may be referred to as an upper side or an upper surface, and the second long side portion LS2 may be referred to as a lower side or a lower surface. When the display device is seen from the front or the front surface, the first short side portion SS1 may be referred to as a left side or a left surface, and the second short side portion SS2 may be referred to as a right side or a right surface.

The first long side LS1, the second long side LS2, the first short side SS1, and the second short side SS2 may be referred to as edges of the display device. In addition, the points at which the first long side LS1, the second long side LS2, the first short side SS1, and the second short side SS2 join may be referred to as corners.

For example, the point at which the first long side LS1 and the first short side SS1 join may be referred to as a first corner C1, the point at which the first long side LS1 and the second short side SS2 join may be referred to as a second corner C2, the point at which the second short side SS2 and the second long side LS2 join may be referred to as a third corner C3, and the point at which the second long side LS2 and the first short side SS1 join may be referred to as a first corner C4.

A direction from the first short side SS1 to the second short side SS2 or a direction from the second short side SS2 to the first short side SS1 may be referred to as a left-rightward direction LR or a horizontal direction DR1. A direction from the first long side LS1 to the second long side LS2 or a direction from the second long side LS2 to the first long side LS1 may be referred to as an up-downward direction UD or a vertical direction DR2).

Figure 2:
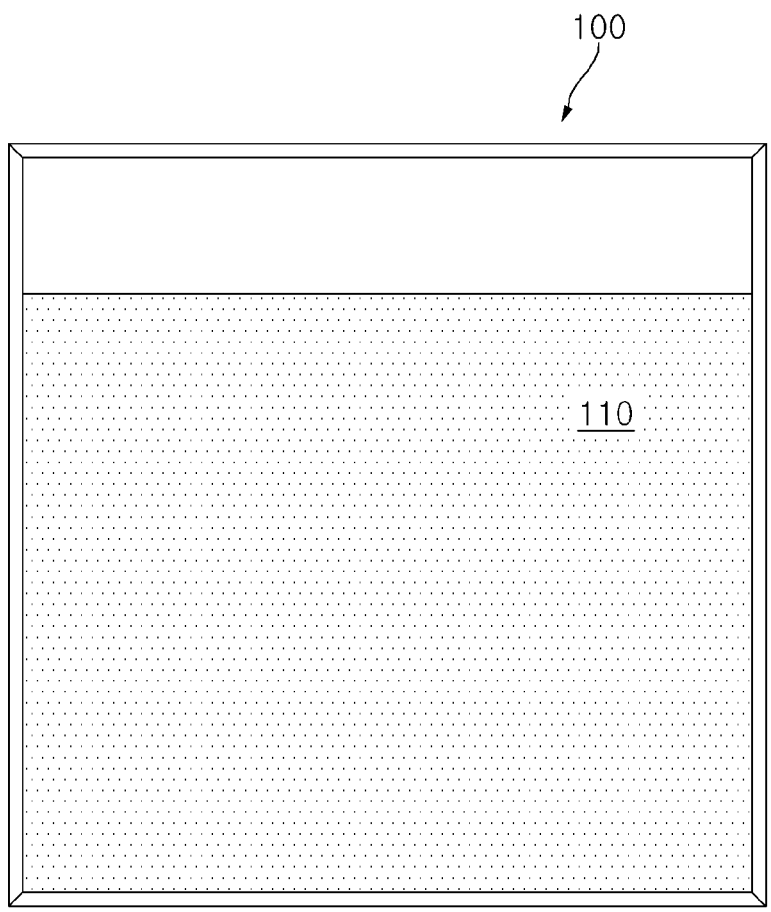
Figure 3:
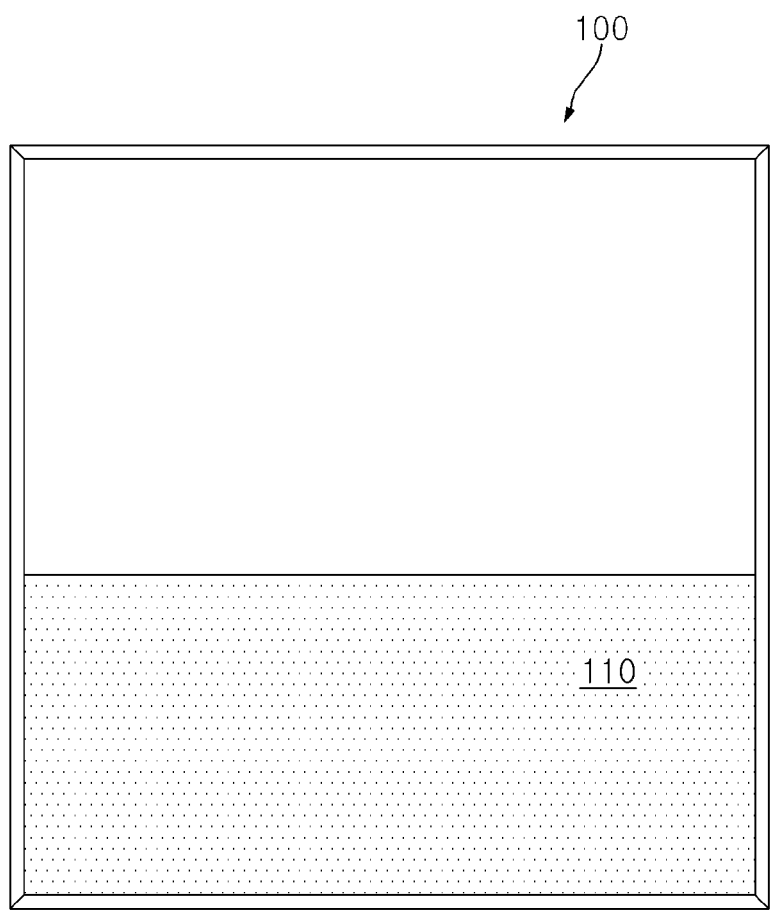

Referring to FIGS. 2 and 3, a display panel 110 may form the front surface of a display device 100, and may move in an up-downward direction.

The display panel 110 may cover the front surface of the display device 100 while ascending upward. The display panel 110 may expose the inside of the display device 100 to the outside while descending downward.

The display panel 110 may cover the front surface of the display device 100 while descending downward. The display panel 110 may expose the inside of the display device 100 to the outside while ascending upward.

Figure 4:
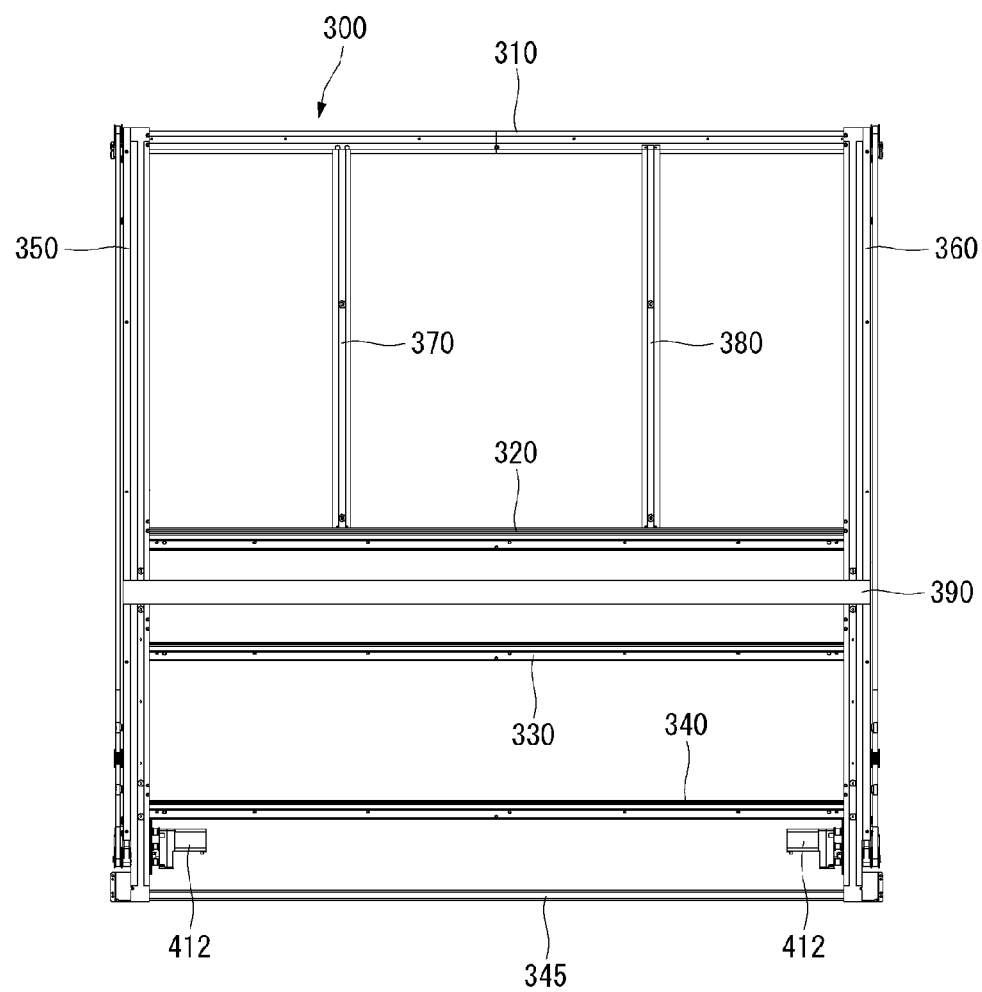
Figure 10:
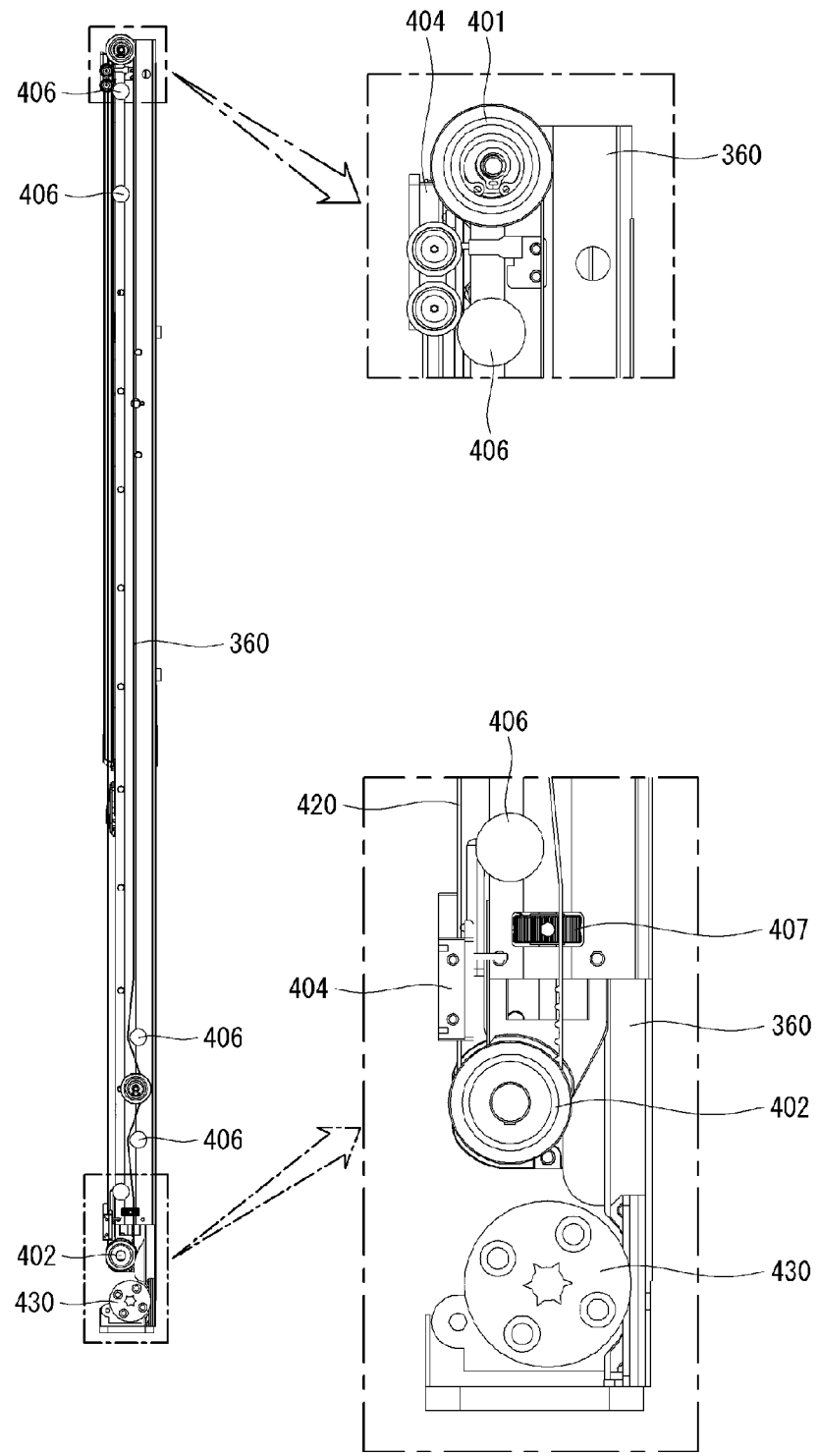

Referring to FIGS. 4 and 10, a frame 300 may form a skeleton of the display device 100 (refer to FIG. 1). The frame 300 may include a horizontal frame 310, 320, 330, and 340, and a vertical frame 350, 360, 370, and 380. There may be a plurality of horizontal frames 310, 320, 330, 340 and 345. There may be a plurality of vertical frames 350, 360, 370, and 380. The frames 300 may be coupled to each other.

A first horizontal frame 310 may be located in an upper side of the display device. A second horizontal frame 320 may be parallel to the first horizontal frame 310, and located below the first horizontal frame 310. A third horizontal frame 330 may be parallel to the second horizontal frame 320, and located below the second horizontal frame 320. A fourth horizontal frame 340 may be parallel to the third horizontal frame 330, and may be located below the third horizontal frame 330.

A first vertical frame 350 may be located in the left side of the first horizontal frame 310 to the fourth horizontal frame 340, and a second vertical frame 360 may be located in the right side of the first horizontal frame 310 to the fourth horizontal frame 340. A third vertical frame 370 and/or a fourth vertical frame 380 may connect the first horizontal frame 310 and the second horizontal frame 320 to each other.

A bar 390 may extend long from the first vertical frame 350 to the second vertical frame 360, and may move in the up-downward direction on the front surfaces of the first vertical frame 350 and the second vertical frame 360.

A bottom frame 345 may form a lower surface of the display device. The frames 300 may be coupled to the bottom frame 345.

Figure 5:
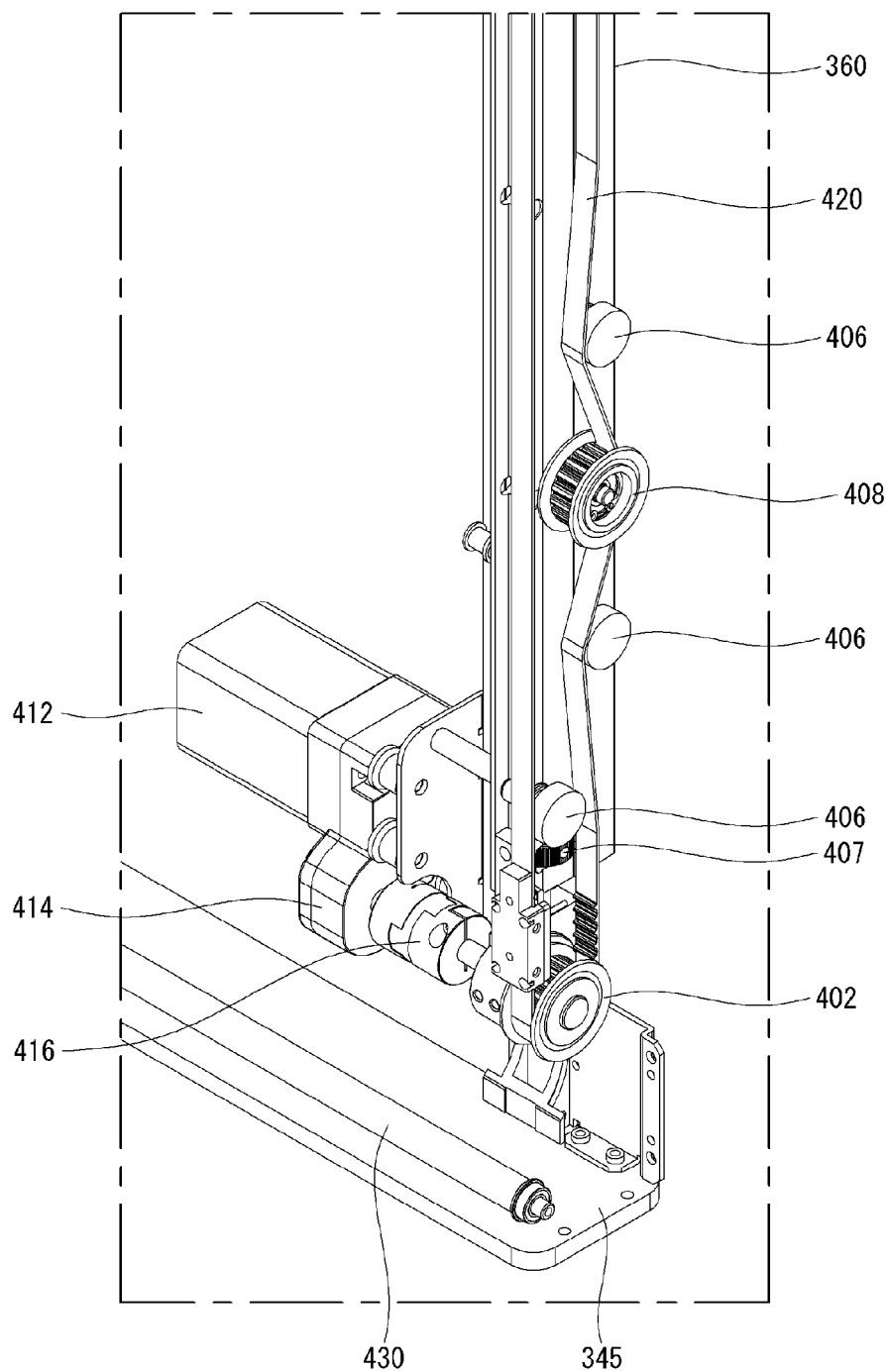

Referring to FIGS. 5 and 10, a motor 412 may be installed in the second vertical frame 360. The motor 412 may provide rotational force. A gearbox 414 may transmit the rotational force provided by the motor 412. One side of a joint 416 may be connected to the gearbox 414. The rotational force provided from the motor 412 may be transmitted to the joint 416 by adjusting the reduction ratio through the gearbox 414.

A pulley 402 may be rotatably mounted in the second vertical frame 360 while being adjacent to the motor 412. The pulley 402 may be referred to as a lower pulley 402. The pulley 408 may be installed on the second vertical frame 360 while being spaced apart from the lower pulley 402. The pulley 408 may be referred to as an intermediate pulley 408. The joint 416 may be connected to the pulley 402 to provide rotational force to the pulley 402. A plurality of tension rollers 406 may be installed along the longitudinal direction of the second vertical frame 360.

A slider 405 may be fixed on a belt 420. The slider 405 may move between the upper end and the lower end of the second vertical frame 360 according to the movement of the belt 420. A sensor 407 may be mounted on the second vertical frame 360 while being adjacent to the lower pulley 402. The sensor 407 may detect the movement of the slider 402. Accordingly, the movement of the display panel 110 (refer to FIGS. 1 to 3) according to the rotation of the belt 420 can be detected. The display panel 110 may be wound around a panel roller 430.

Figure 6:
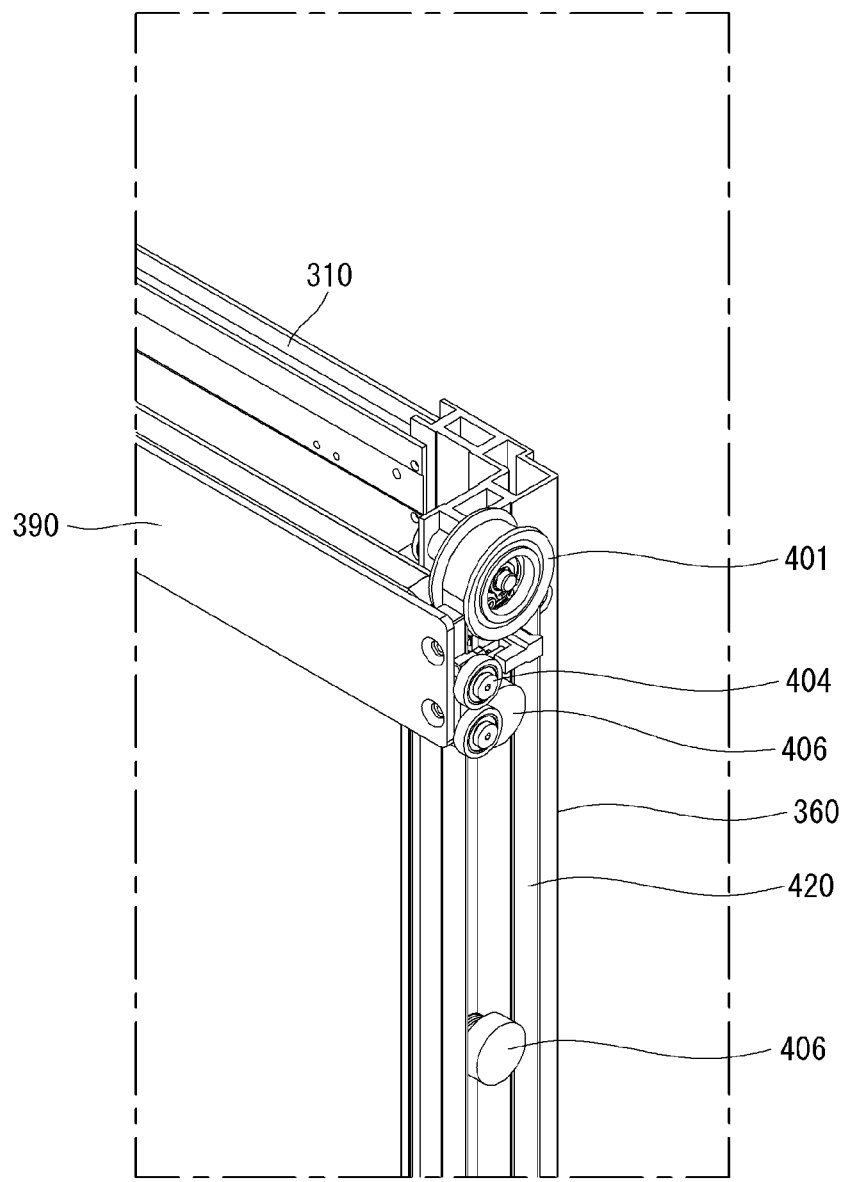

The same configuration and description may be applied to the first vertical frame 350. Referring to FIGS. 6 and 10, the pulley 401 may be rotatably mounted adjacent to the upper end of the second vertical frame 360. The pulley 401 may be referred to as an upper pulley 401. A plurality of tension rollers 406 may be installed along the longitudinal direction of the second vertical frame 360. The bar 390 may move on the second vertical frame 360. A guide roller 404 may be installed in one end and/or both ends of the bar 390. The guide roller 404 may move on the second vertical frame 360 together with the bar 390. An upper side of the display panel 110 (refer to FIGS. 1 to 3) may be fixed to the bar 390. The same configuration and description may be applied to the first vertical frame 350.

Referring to FIGS. 5, 6 and 10, the belt 420 may be caught on an upper pulley 401, an intermediate pulley 408, and/or a lower pulley 402. For example, belt 420 may be a timing belt. The belt 420 may be caught on the tension roller 406 while being caught on the pulleys 401, 402, and 408 to maintain tension. Accordingly, the belt 420 may maintain a constant tension. The same configuration and description may be applied to the first vertical frame 350.

Figure 7:
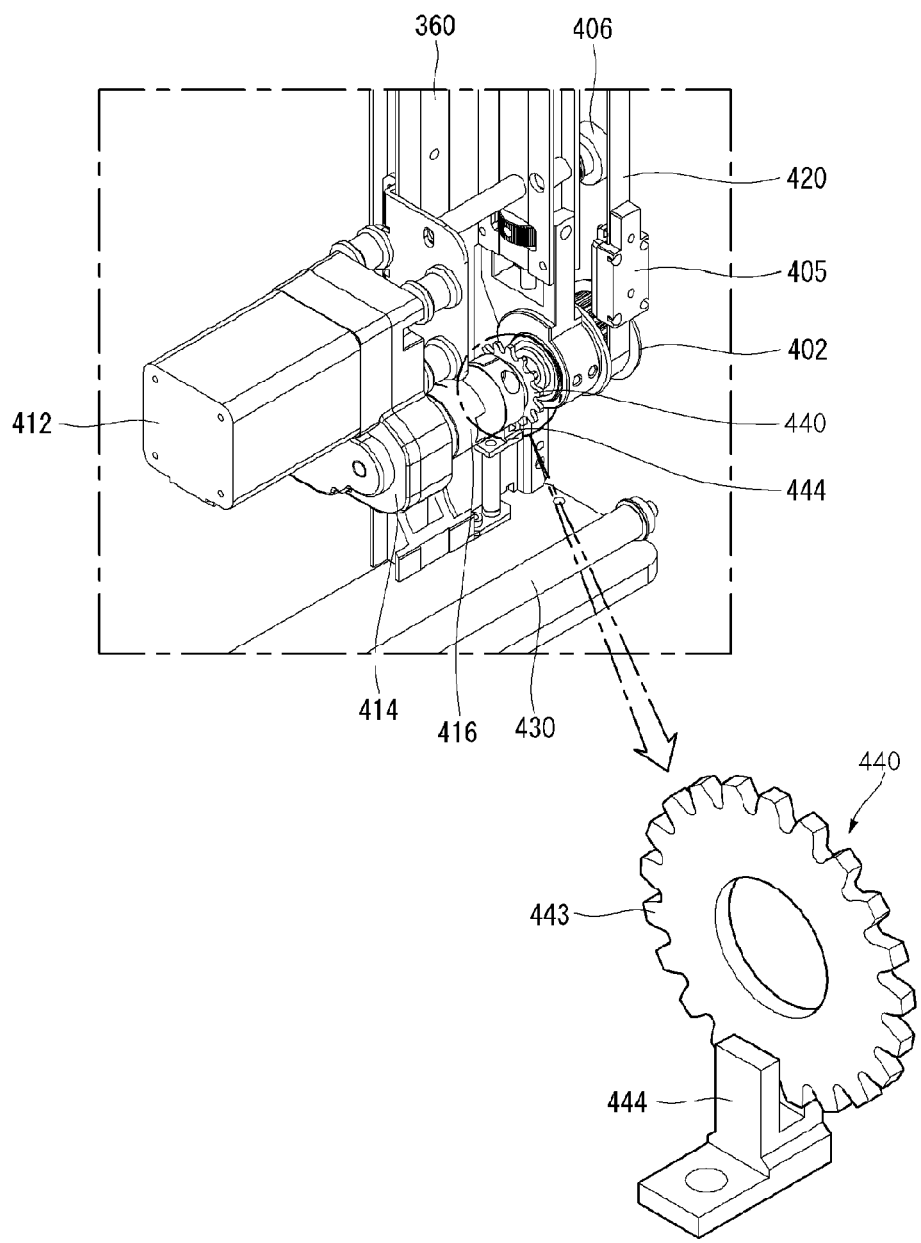

Referring to FIGS. 7 and 10, a rotator 440 may be located between the joint 416 and the pulley 402, and may rotate simultaneously with the rotation of the joint 416 and/or the pulley 402. The rotator 440 may include a plurality of protrusions 443 along a circumference. The sensor 444 may be installed in the second vertical frame 360 while being adjacent to the outer surface of the rotator 440. The sensor 444 may detect the rotation of the rotator 440. The same configuration and description may be applied to the first vertical frame 350. Accordingly, it is possible to synchronize the motors 412 installed in the left and right sides of the frame 300 (refer to FIG. 4).

Figure 8:
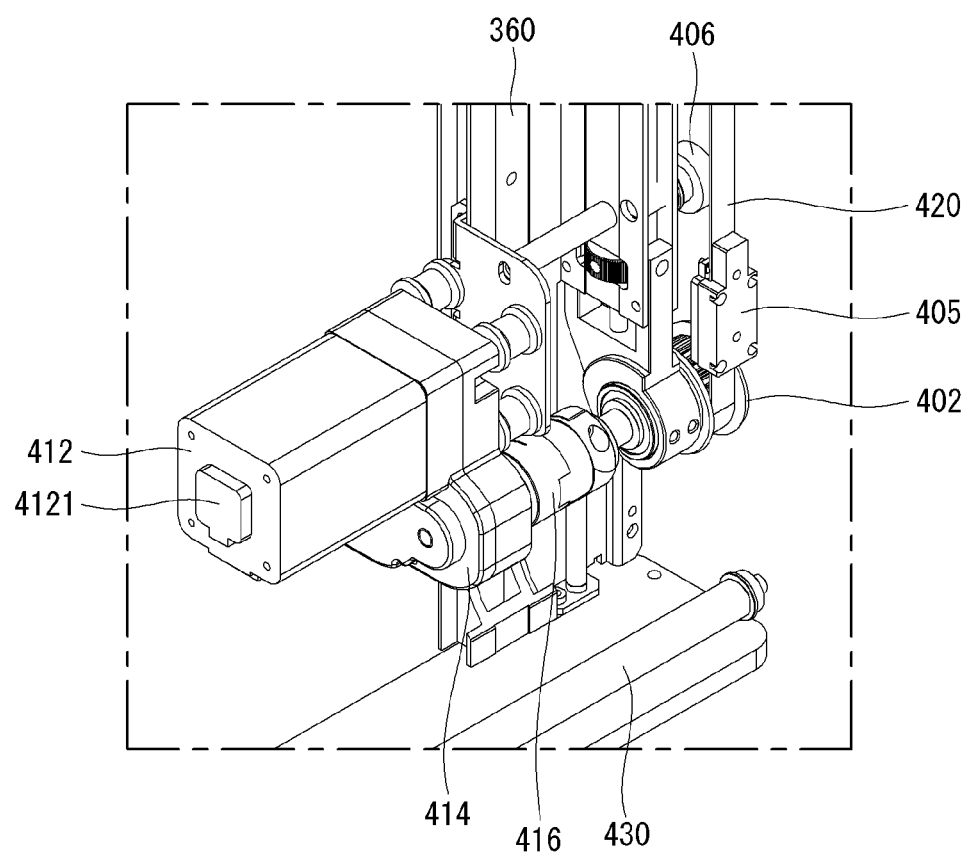

Referring to FIGS. 8 and 10, the motor 412 may be, for example, a step motor. An encoder 4121 may be installed in the motor 412. The encoder 4121 may control the rotation of the motor 412. The same configuration and description may be applied to the first vertical frame 350. Accordingly, it is possible to synchronize the motors 412 installed in the left and right sides of the frame 300 (refer to FIG. 4).

Figure 9:
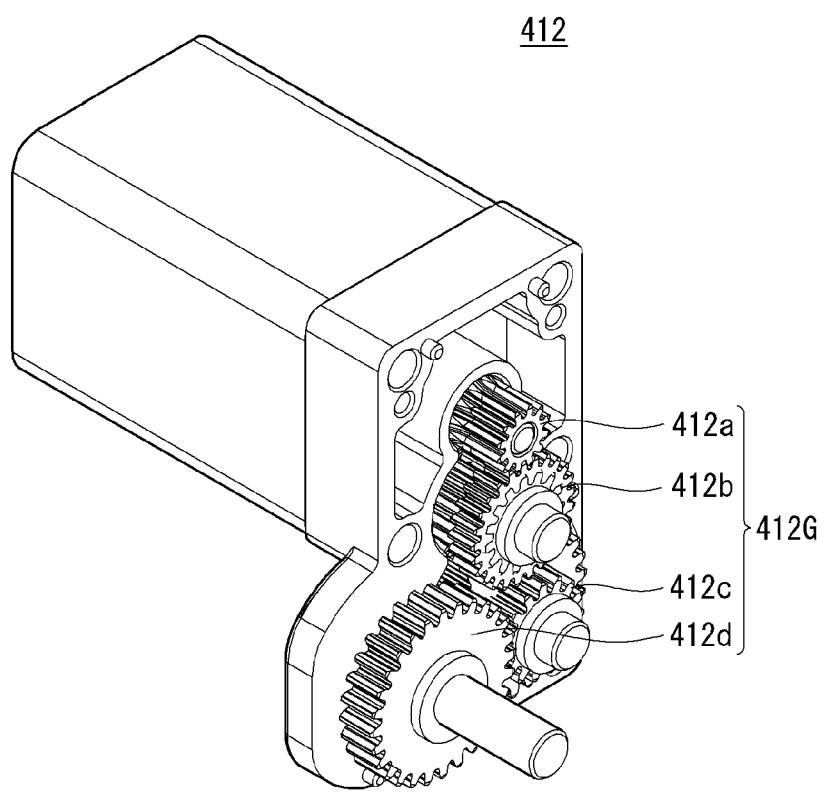

Referring to FIG. 9, the motor 412 may include gears 412G. The gears 412G may include a first gear 412a, a second gear 412b, a third gear 412c, and/or a fourth gear 412d. The first gear 412a may be connected or fixed to the rotation shaft of the motor 412.

For example, the gear ratio between the first gear 412a and the second gear 412b may be 2.08. As another example, the gear ratio between the second gear 412b and the third gear 412c may be 1.87. As another example, the gear ratio between the third gear 412c and the fourth gear 412d may be 1.87. The reduction ratio of the first gear 412a to the fourth gear 412d may be, for example, 7.2. The reduction ratio of the first gear 412a to the fourth gear 412d may be 6 to 8.

Figure 11:
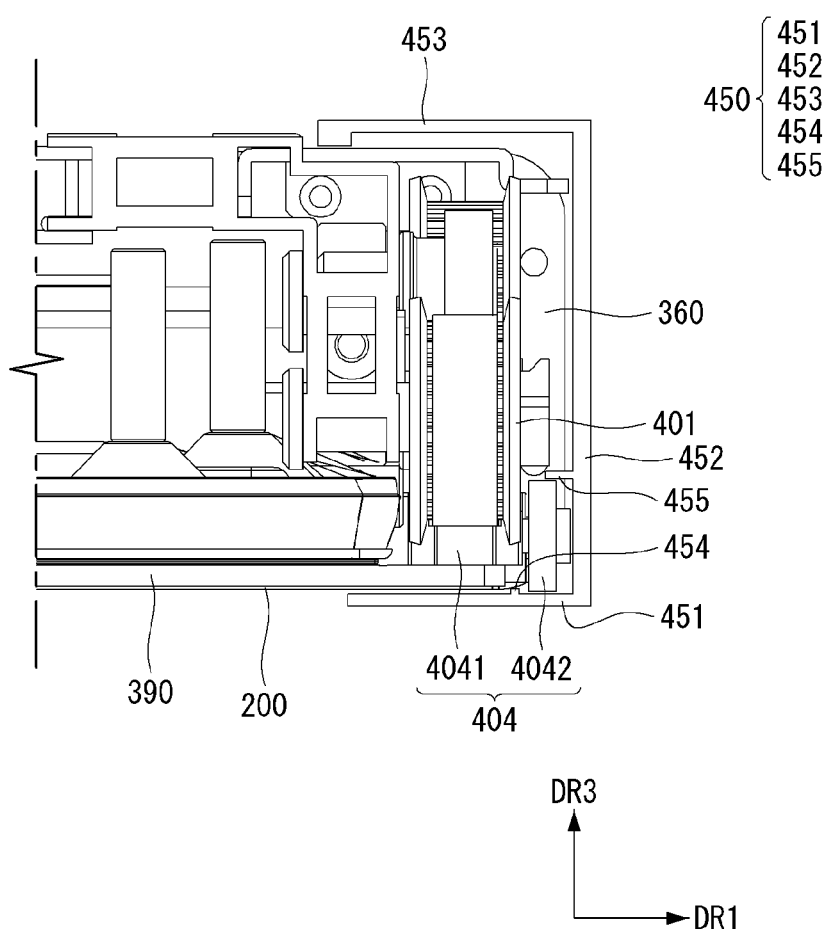

Referring to FIG. 11, a side cover 450 may cover the outer surface of the second vertical frame 360. The side cover 450 may include a first part 451, a second part 452, and a third part 453. The first part 451 may extend in a first direction DR1. The second part 452 may extend in a third direction DR3 and may be connected to the first part 451. The third part 453 may extend in the first direction DR1 and may be connected to the second part 452.

The first part 451 may cover a part of the front surface of the bar 390. The second part 452 may cover the outer surface of the second vertical frame 360. The third part 453 may be located in the rear of the second vertical frame 360.

The side cover 450 may include guide ribs 454 and 455. The guide ribs 454 and 455 may protrude inwardly of the first part 451 and/or the second part 452 while being adjacent to the guide roller 404. Accordingly, the movement of the bar 390 and the display panel 110 may be guided.

Figure 12:
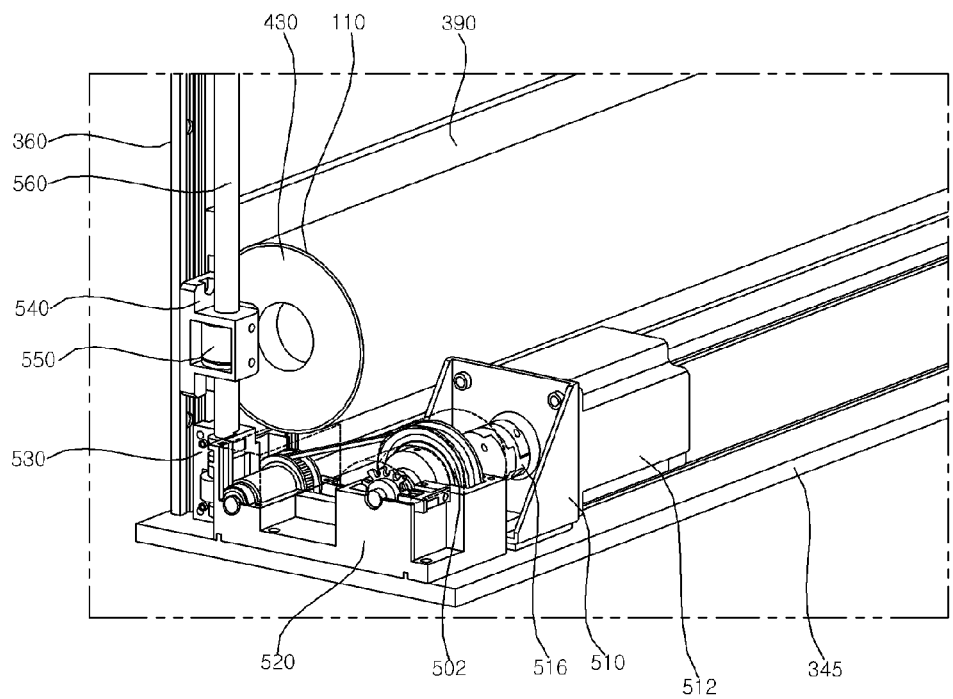

The same configuration and description may be applied to the first vertical frame 350. Referring to FIG. 12, a bracket 510 may be mounted on the bottom frame 345. The bracket 510 may be referred to as a motor bracket 510. The motor 512 may be located on the bottom frame 345 and may be fixed to the bracket 510. A pulley mount 520 may be mounted on the bottom frame 345. The pulley mount 520 may be located adjacent to the motor 512. The bracket 510 may be located between the pulley mount 520 and the motor 512.

The pulley 502 may be mounted on the pulley mount 520. The pulley 502 may rotate on the pulley mount 520. A joint 516 may connect the pulley 502 and the rotation shaft of the motor 512. The motor 512 may transmit power to the pulley 502 via joint 516. The pulley 502 may be referred to as a first pulley 502.

A lead screw 560 may be located parallel to the vertical frame 360. The lead screw 560 may be rotatably installed in the bottom frame 345. A screw mount 530 may be mounted on the bottom frame 345 while being adjacent to the vertical frame 360. The lead screw 560 may be rotatably coupled to the screw mount 530.

The lead screw 560 may be inserted into a slider 540. The slider 540 may move in the up-downward direction of the lead screw 560. The slider 540 may move in the up-downward direction while making contact with the vertical frame 360. The bar 390 may be connected to or coupled to the slider 540. The slider 540 may move in the up-downward direction along the lead screw 560 together with the bar 390.

A screw nut 550 may be coupled to the slider 540. The screw nut 550 may have a cylindrical shape and may have threads on its inner circumferential surface. The threads of the screw nut 550 may be engaged with threads formed on the outer circumferential surface of the lead screw 560. When the lead screw 560 rotates, the slider 540 may move in the up-downward direction of the lead screw 560 by the screw nut 550.

Figure 13:
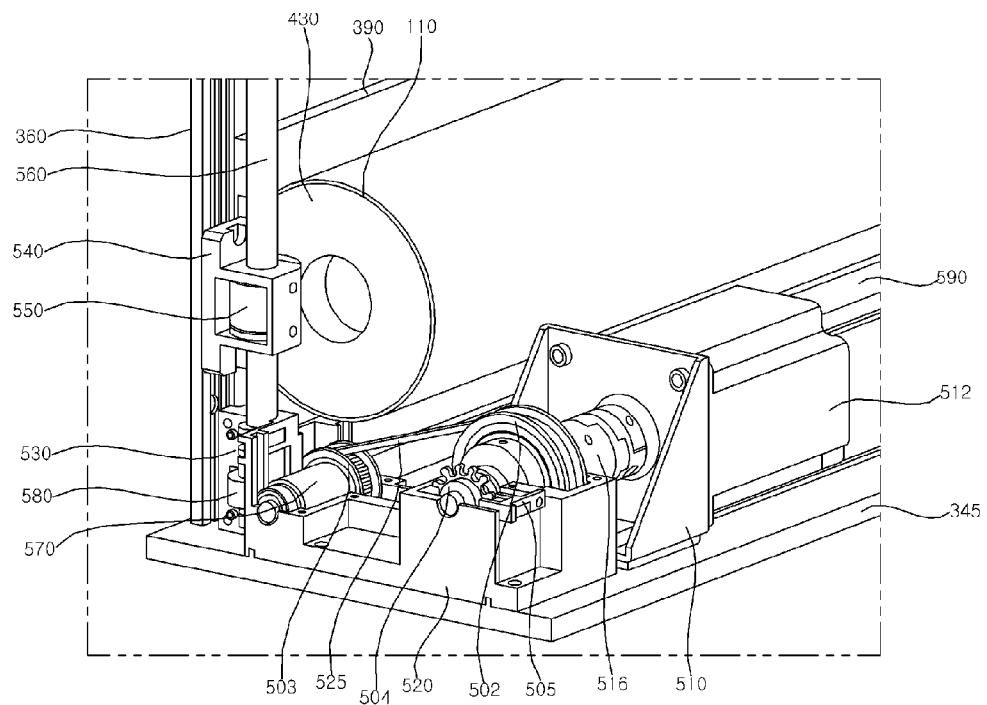

Referring to FIG. 13, an indicator 504 may be coupled to the rotation shaft of the first pulley 502. The indicator 504 may rotate with the first pulley 502. The sensor 505 may be mounted on the pulley mount 520 while being adjacent the indicator 504. The sensor 505 may detect the rotation of the indicator 504.

The second pulley 503 may be mounted in the pulley mount 520 while being spaced apart from the first pulley 502. A diameter of the second pulley 503 may be smaller than a diameter of the first pulley 502. The belt 525 may connect the first pulley 502 and the second pulley 503. The belt 525 may contact the outer circumferential surface of the first pulley 502 and the outer circumferential surface of the second pulley 503. When the first pulley 502 rotates, the second pulley 503 may also rotate by the belt 525.

A transmission shaft 590 may be inserted into the second pulley 503, and rotatably installed in the pulley mount 520. The transmission shaft 590 may be fixed to the second pulley 503 and rotate together with the second pulley 503. The transmission shaft 590 may be inserted into a worm 570. The worm 570 may be installed in the pulley mount 520 while being adjacent to the screw mount 530. The worm gear 580 may be fixed to the lower end of the lead screw 560. The worm gear 580 may be engaged with the worm 570.

Accordingly, the rotational force provided by the motor 512 may be transmitted to the lead screw 560 through the first pulley 502, the belt 525, the second pulley 503, the worm 570, and the worm gear 580.

Figure 14:
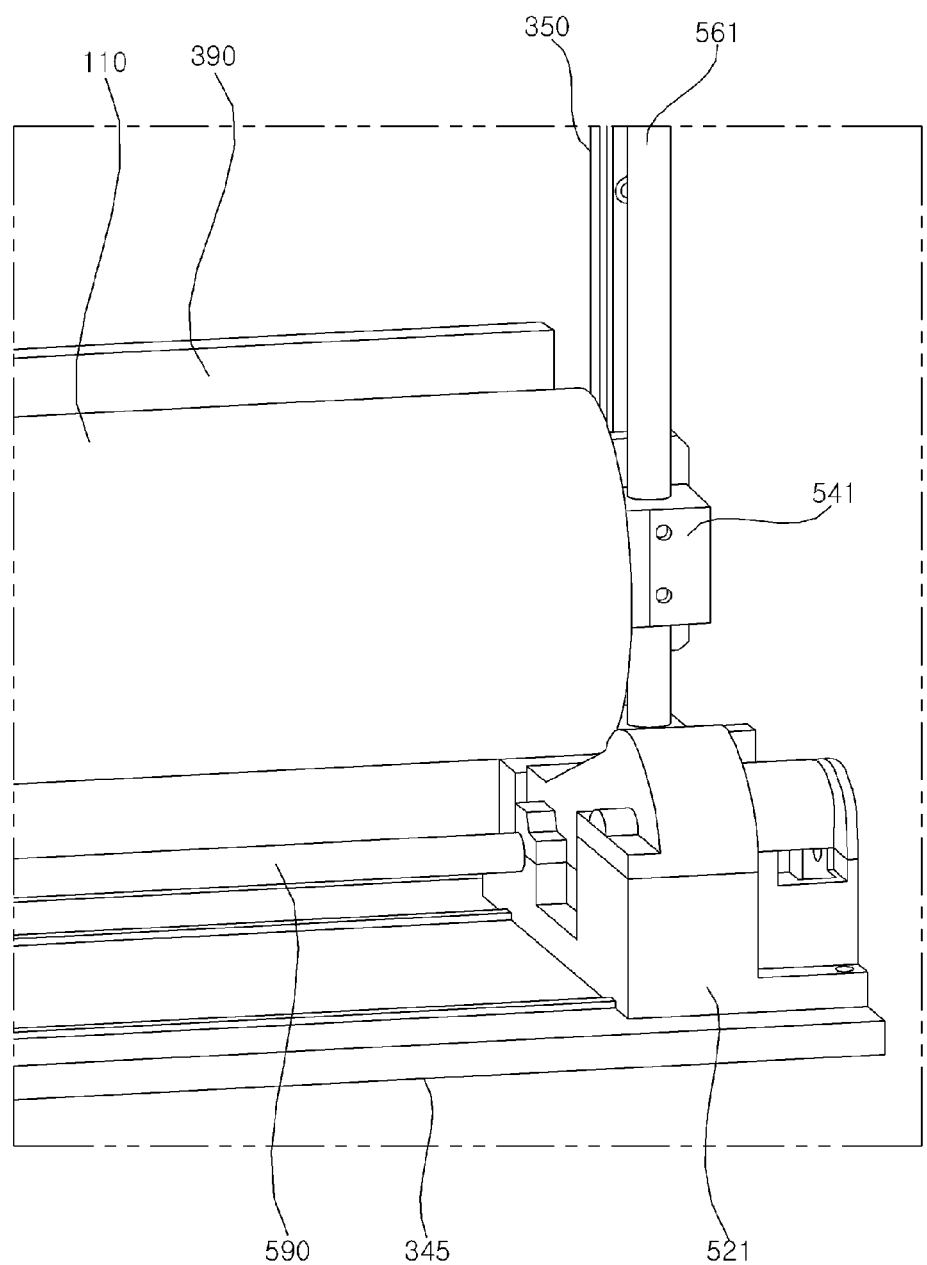

Referring to FIG. 14, the lead screw 561 may be located parallel to the vertical frame 350. The lead screw 561 may be rotatably installed in the bottom frame 345.

The lead screw 561 may be inserted into the slider 541. The slider 541 may move in the up-downward direction of the lead screw 561. The slider 541 may move in the up-downward direction while making contact with the vertical frame 350. The bar 390 may be connected to or coupled to the slider 541. The slider 541 may move in the up-downward direction along the lead screw 561 together with the bar 390.

The gearbox 521 may be mounted on the bottom mount 345. The gearbox 521 may connect the transmission shaft 590 and the lead screw 561. For example, the gearbox 521 may include a worm gear. The worm gear may transmit the rotational force of the transmission shaft 590 to the lead screw 561 to rotate the lead screw 561.

Figure 15:
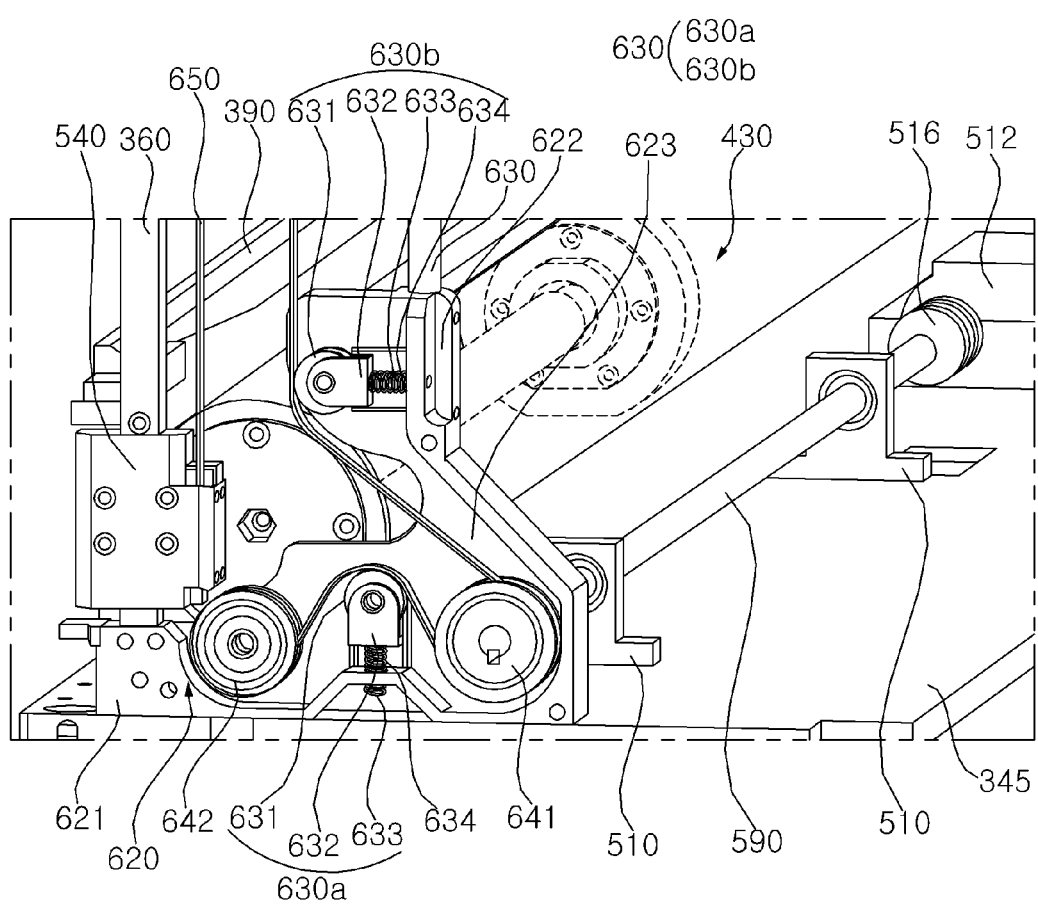

Referring to FIG. 15, the panel roller 430 may be rotatably mounted on the bottom frame 345. The second vertical frame 360 may be located adjacent to a distal end of the panel roller 430, and may be fixed to the bottom frame 345. The motor 512 may be mounted on the bottom frame 345 while being adjacent to the center of the bottom frame 345 or adjacent to the center of the panel roller 430.

The transmission shaft 590 may extend long in the longitudinal direction of the bottom frame 345. The transmission shaft 590 may be supported by the brackets 510 and rotate in the bottom frame 345. The motor 512 may provide a rotational force to the transmission shaft 590. The motor shaft 512a (refer to FIG. 16) may protrude to one side of the motor 512 and rotate. The joint 516 may connect the motor shaft 512a (refer to FIG. 16) and the transmission shaft 590. The joint 516 may transmit the rotational force of the motor shaft 512a (refer to FIG. 16) to the transmission shaft 590.

The vertical frame 360 may be fixed to the bottom frame 345 while being adjacent to one end of the bottom frame 345. The vertical frame 360 may be located adjacent to the distal end of the panel roller 430. A roller mount 620 may be fixed on the bottom frame 345. The vertical frame 360 may be coupled on the roller mount 620.

The bar 390 may move in the up-downward direction in the vertical frame 360. The bar 390 may be located in parallel with the panel roller 430. The slider 540 may move on the vertical frame 360 in the longitudinal direction of the vertical frame 360. The bar 390 may be fixed to the slider 540.

The roller mount 620 may include a frame mount 621, a support mount 622, and a roller plate 623. The frame mount 621 may be mounted on the bottom frame 345, and the vertical frame 360 may be coupled to or fixed to the frame mount 621. The roller plate 623 may form a flat plate. The frame mount 621 may be formed in one side of the roller plate 623. The support mount 622 may be formed in the upper side of the roller plate 623. A support bar 630 may be fixed on the support mount 622.

A first roller 641 may be rotatably installed on the roller plate 623. The first roller 641 may be fixed to the transmission shaft 590. The first roller 641 may rotate together with the transmission shaft 590. A second roller 642 may be located between the first roller 641 and the vertical frame 360. The second roller 642 may be located adjacent to the vertical frame 360. The second roller 642 may be rotatably installed on the roller plate 623.

The tension roller 630 may include a spoke 632 and a roller 631. The roller 631 may rotate in the spoke 632, 633, 634. The spoke 632, 633, and 634 may move in the up-downward direction or in the left-rightward direction in the roller plate 623. The spoke 632, 633, and 634 may include a holder 632, a rod 633, and an elastic member 634. The roller 631 may be mounted in the holder 632. The roller 631 may rotate in the holder 632. The rod 633 may extend from the holder 632. The rod 633 may be inserted into the elastic member 634. For example, the elastic member 634 may be a coil spring. One end of the elastic member 634 may be supported by the roller plate 623, and the other end of the elastic member 634 may be supported by the holder 632.

The belt 650 may be wound around the first roller 641 and the second roller 642. The slider 540 may be fixed to the belt 650. A first tension roller 630a may be located between the first roller 641 and the second roller 642. A second tension roller 630b may be located above the first roller 641 and/or the second roller 642.

The first tension roller 630a may push the belt 650 at between the first roller 641 and the second roller 642. The first tension roller 630a allows the belt 650 to be more wound around the first roller 641 and/or the second roller 642. For example, the area in which the belt 650 contacts the first roller 641 and/or the second roller 642 in a state where the first tension roller 630a is removed may be smaller than the area in which the belt 650 contacts the first roller 641 and/or the second roller 642 in a state where the first tension roller 630a pushes the belt 650. The first tension roller 630a may increase the tension of the belt 650.

The second tension roller 630b may push the belt 650 in the slider direction. The belt 650 may be more wound around the first roller 641 by the second tension roller 630b. For example, the area in which the belt 650 contacts the first roller 641 in a state where the second tension roller 630b is removed may be smaller than the area in which the belt 650 contacts the first roller 641 in a state where the second tension roller 630b pushes the belt 650. The second tension roller 630b may increase the tension of the belt 650.

Figure 16:
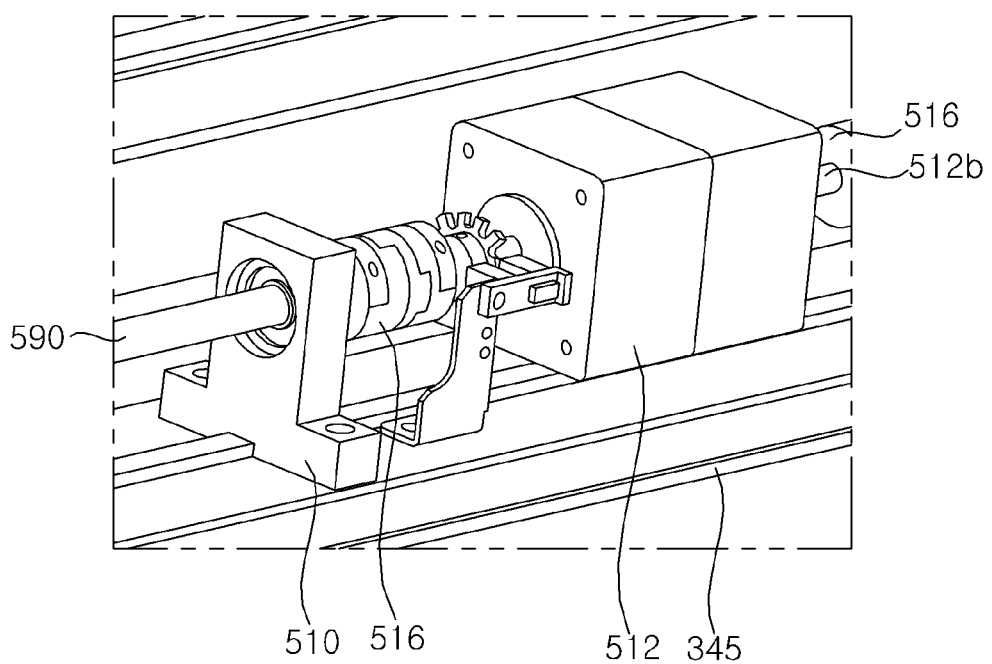
Figure 17:
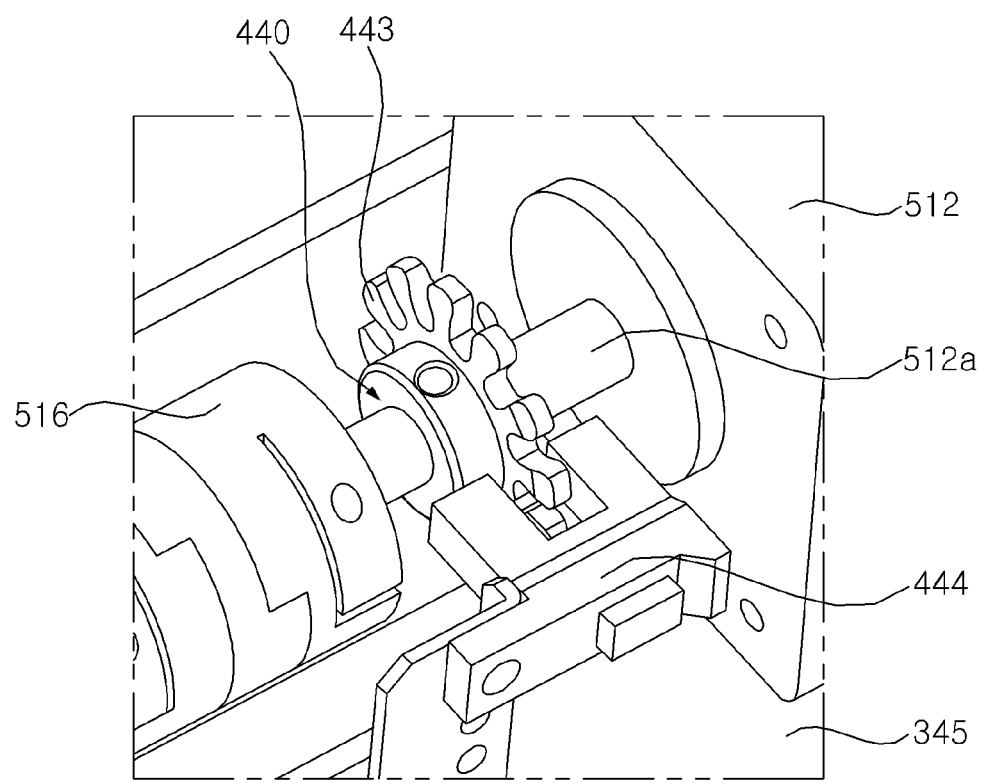

Referring to FIGS. 16 and 17, the motor 512 may include a plurality of motor shafts 512a and 512b. The rotation of the motor 512 may be distributed and transmitted to both sides of the motor 512. A first motor shaft 512a may be connected to the first joint 516. A second motor shaft 512b may be connected to the second joint 516. The rotator 440 may be fixed to the first motor shaft 512a. When the first motor shaft 512a rotates, the rotator 440 may also rotate. The rotator 440 may include a plurality of protrusions 443. For example, the rotator 440 may be a disk, and the plurality of protrusions 443 may be formed on the outer circumferential surface of the rotator 440. The sensor 444 may be located adjacent to the rotator 440. The sensor 444 may detect the rotation of the rotator 440.

Figure 18:
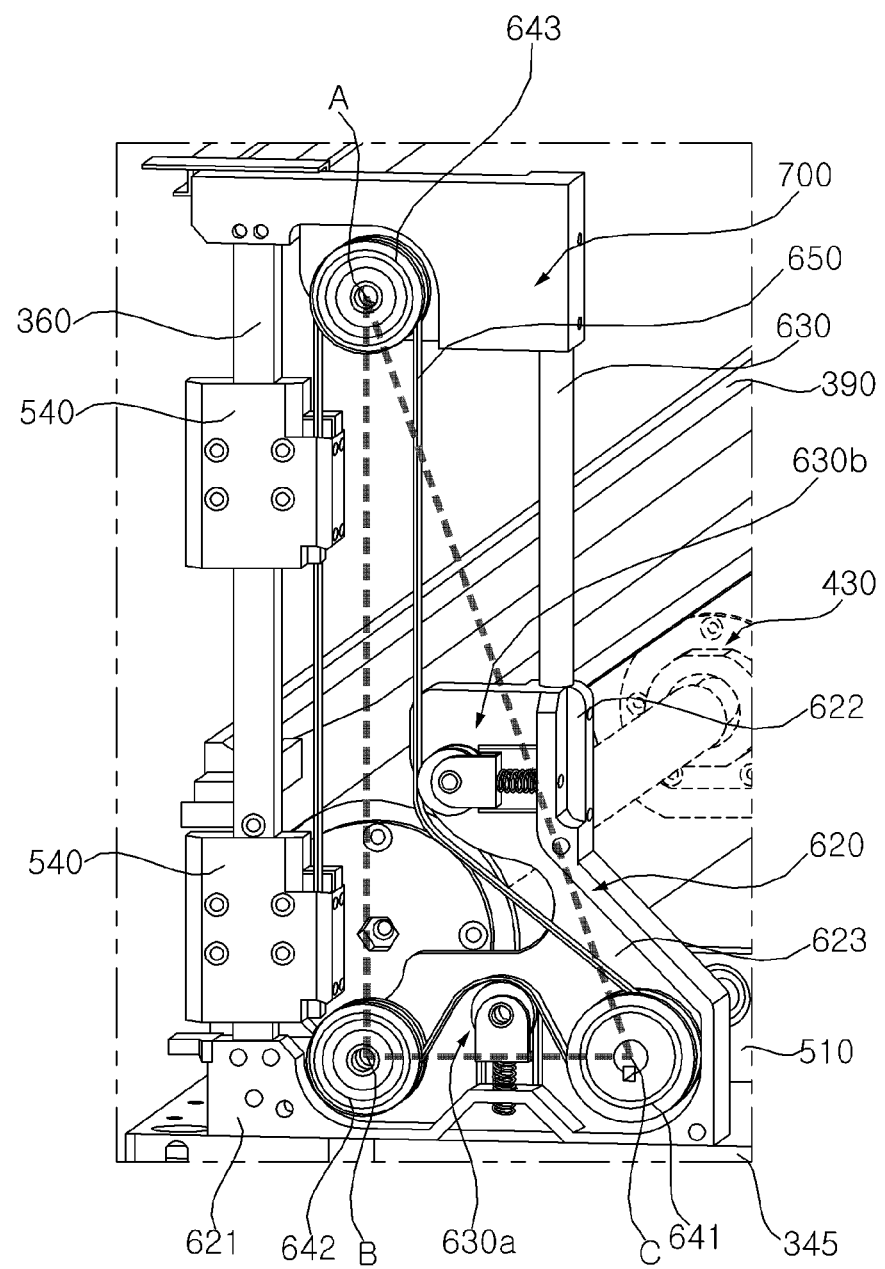

Referring to FIG. 18, a top block 700 may be placed on the side frame 360 and the support bar 630. The top block 700 may be coupled to the side frame 360 and the support bar 630. A third roller 643 may be rotatably mounted on the top block 700. The belt 650 may be wound around the rollers 641, 642, and 643 while connecting the first roller 641, the second roller 642, and the third roller 643.

A first connection line AB may connect a rotation center B of the second roller 642 and a rotation center A of the third roller 643. A second connection line BC may connect a rotation center C of the first roller 641 and the rotation center B of the second roller 642. A third connection line AC may connect the rotation center C of the first roller 641 and the rotation center A of the third roller 643.

The first tension roller 630a may cross the second connection line BC, and may be located within a triangle formed by the first connection line AB, the second connection line BC, and the third connection line AC. The second tension roller 630b may cross the third connection line AC, and may be located within a triangle formed by the first connection line AB, the second connection line BC, and the third connection line AC.

For example, the belt 650 between the second roller 642 and the third roller 643 may be parallel to the first connection line AB. As another example, the belt 650 between the third roller 643 and the second tension roller 630b may be parallel to the first connection line AB. The first connection line AB may be located between the belt 650 between the second roller 642 and the third roller 643 and the third roller 643 and the second tension roller 630b.

Figure 19:
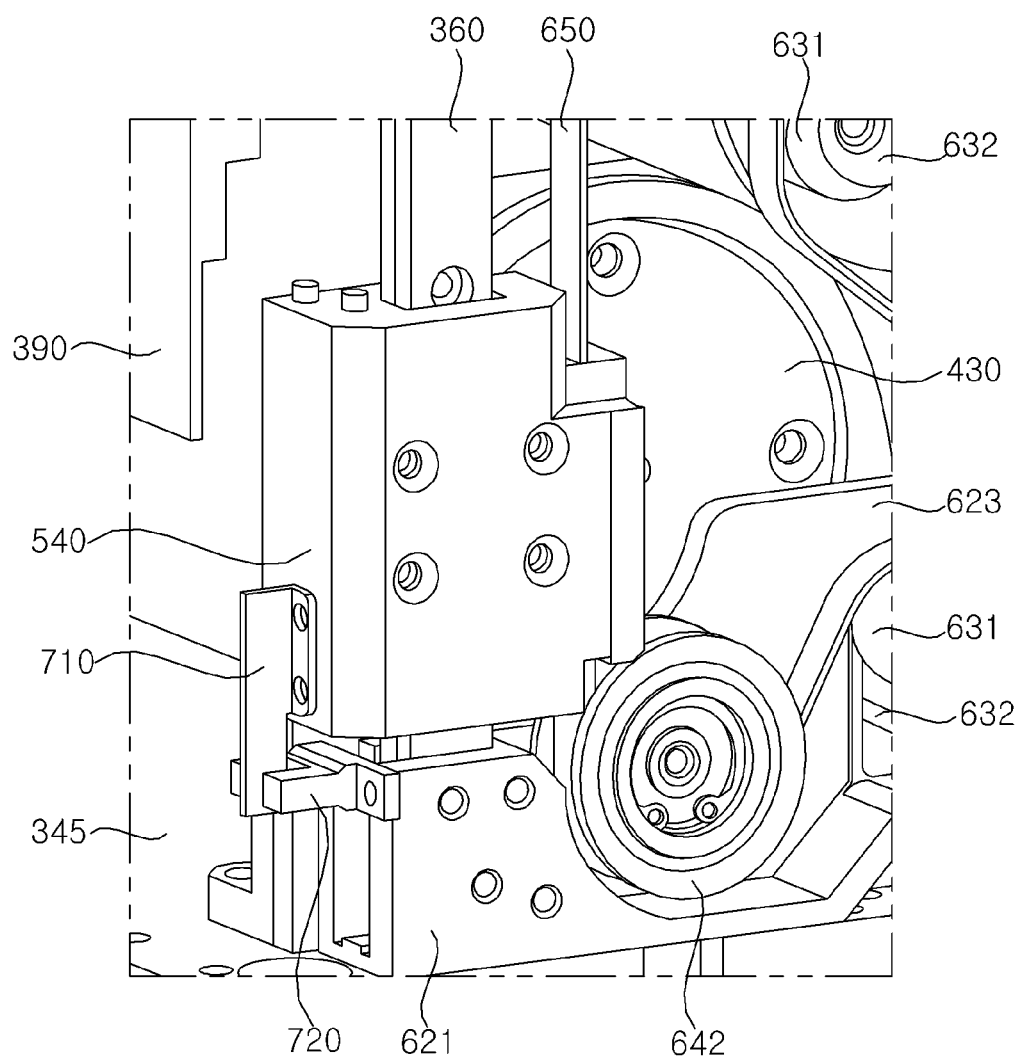

Referring to FIG. 19, a sensor plate 710 may be fixed to the slider 540. The sensor plate 710 may extend while protruding toward one side of the slider 540. The sensor plate 710 may extend toward the lower side of the slider 540. The sensor 720 may be installed on the frame mount 621. The sensor 720 may be located adjacent to the bottom frame 345. The sensor 720 may detect the location of the sensor plate 710 when the sensor plate 710 is adjacent to the sensor 720. For example, the sensor 720 may be an optical sensor, a proximity sensor, or a Hall sensor. Accordingly, the sensor 720 may detect the bottom dead center of the slider 540.

According to an aspect of the present disclosure, there is provided a display device including: a flexible display panel: a panel roller which extends long, and around which the display panel is wound or from which the display panel is unwound; a bottom frame in which the panel roller is rotatably mounted: a first vertical frame which extends long in a direction intersecting a longitudinal direction of the panel roller, and is fixed to the bottom frame: a top block fixed to an upper side of the first vertical frame: a first slider which moves in an up-downward direction in the first vertical frame: an upper roller rotatably installed in the top block: a roller mount which is located adjacent to a lower end of the first vertical frame, and fixed to the bottom frame: a lower roller rotatably installed in the roller mount: a belt which is wound around the upper roller and the lower roller, and to which the first slider is fixed; and a bar to which a distal end of the display panel is fixed, and which is coupled to the first slider.

According to another aspect of the present disclosure, the display device further includes a driving roller rotatably installed in the roller mount, and the belt is wound around the driving roller, the upper roller, and the lower roller.

According to another aspect of the present disclosure, the display device further includes a first tension roller which is located between the driving roller and the lower roller, is rotatably installed in the roller mount, and pushes the belt between the driving roller and the lower roller.

According to another aspect of the present disclosure, the display device further includes a second tension roller which is located between the upper roller and the driving roller, is rotatably installed in the roller mount, and pushes the belt between the upper roller and the driving roller.

Rotation centers of the first tension roller and the second tension roller are located in an inner side of a line connecting a rotation center of the upper roller, the lower roller, and the driving roller.

According to another aspect of the present disclosure, the display device further includes a motor which is located in a rearward direction of the panel roller, and mounted in the bottom frame; and a transmission shaft which has one end connected to the motor, and has the other end connected to the driving roller, wherein the motor provides a rotational force to the transmission shaft, and the transmission shaft rotates together with the driving roller.

The first tension roller includes: a roller in contact with the belt: a holder in which the roller is rotatably installed: a rod which extends from the holder, and moves in the roller mount; and an elastic member which has one end supported by the roller mount, and the other end supported by the holder.

The rod extends in a direction intersecting the belt.

The belt between the upper roller and the second tension roller is parallel to the belt between the upper roller and the lower roller, by the second tension roller, The second tension roller is located adjacent to a lower end of the support bar.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a flexible display panel;
   a panel roller which extends long, and winds up and unwinds the display panel;
   a bottom frame on which the panel roller is rotatably mounted;
   a first vertical frame elongated in a direction intersecting a longitudinal direction of the panel roller, and fixed to the bottom frame;
   a top block fixed to an upper side of the first vertical frame;
   a first slider moving in an up-downward direction on the first vertical frame;
   an upper roller rotatably mounted on the top block;
   a roller mount located adjacent to a lower end of the first vertical frame, and fixed to the bottom frame;
   a lower roller rotatably mounted on the roller mount;
   a belt wound around the upper roller and the lower roller, and the first slider is fixed to the belt; and
   a bar fixed to a distal end of the display panel, and coupled to the first slider.

2. The display device of claim 1, further comprising a driving roller rotatably mounted on the roller mount,
   wherein the belt is wound around the driving roller, the upper roller, and the lower roller.

3. The display device of claim 2, further comprising a first tension roller between the driving roller and the lower roller, the first tension roller rotatably mounted on the roller mount, and pushing the belt between the driving roller and the lower roller.

4. The display device of claim 3, further comprising a second tension roller located between the upper roller and the driving roller, rotatably mounted on the roller mount, and pushing the belt between the upper roller and the driving roller.

5. The display device of claim 4, wherein rotation centers of the first tension roller and the second tension roller are located in an inner side of a line connecting a rotation center of the upper roller, the lower roller, and the driving roller.

6. The display device of claim 5, further comprising:
a motor at a rear of the panel roller, and mounted on the bottom frame; and
a transmission shaft including one end connected to the motor, and the other end connected to the driving roller, wherein the motor provides a rotational force to the transmission shaft such that the transmission shaft rotates together with the driving roller.

7. The display device of claim 6, wherein the first tension roller comprises:
a roller in contact with the belt;
a holder on which the roller is rotatably mounted;
a rod extending from the holder, and moving on the roller mount; and
an elastic member including one end supported by the roller mount, and the other end supported by the holder.

8. The display device of claim 7, wherein the rod extends in a direction intersecting the belt.

9. The display device of claim 8, wherein the second tension roller provides the belt between the upper roller and the second tension roller in parallel with the belt between the upper roller and the lower roller.

10. The display device of claim 9, further comprising a support bar coupled to the roller mount and the top block, wherein the second tension roller is located adjacent to a lower end of the support bar.

\* \* \* \* \*